United States Patent [19]

Rohringer et al.

[11] 4,116,702

[45] Sep. 26, 1978

[54] AGENT FOR FLAME PROOFING SYNTHETIC FIBROUS MATERIAL

[75] Inventors: Peter Rohringer, Basel; Frank Lohmann, Arlesheim; Rudolf F. Wurster, Pfeffingen, all of Switzerland

[73] Assignee: Ciba-Geigy Corporation, Ardsley, N.Y.

[21] Appl. No.: 723,279

[22] Filed: Sep. 15, 1976

Related U.S. Application Data

[63] Continuation of Ser. No. 532,448, Dec. 13, 1974, abandoned.

[51] Int. Cl.² ............................................. C09D 5/18
[52] U.S. Cl. ........................... 106/15 FP; 106/190; 106/197 R; 106/197 C; 252/8.1; 260/29.6 B; 260/DIG. 24

[58] Field of Search .............. 106/15 FP, 190, 197 R, 106/197 C; 252/8.1; 260/29.6 B, DIG. 24

[56] References Cited

U.S. PATENT DOCUMENTS

| 3,419,518 | 12/1968 | Mahling et al. | 106/15 FP |
|---|---|---|---|
| 3,877,974 | 4/1975 | Mischutin | 252/8.1 |
| 3,974,310 | 8/1976 | Mischutin | 252/8.1 |

*Primary Examiner*—Lorenzo B. Hayes
*Attorney, Agent, or Firm*—Edward McC. Roberts; Prabodh I. Almaula

[57] ABSTRACT

The invention relates to a flameproofing agent which contains a brominated cycloalkane and a dispersant. The flame-proofing agent may also contain a protective colloid and/or water. In addition, a method of providing synthetic materials of polyester or polyamide with a flame-retardant finish with the aqueous flameproofing agents is disclosed.

4 Claims, No Drawings

AGENT FOR FLAME PROOFING SYNTHETIC FIBROUS MATERIAL

This is a continuation of application Ser. No. 532,448, filed on Dec. 13, 1974, now abandoned.

The invention provides a flameproofing agent which contains (a) a brominated cycloalkane with 7 to 12, in particular 8 to 12, ring carbon atoms and 4 to 6 bromine atoms bonded to these ring carbon atoms,
(b) a dispersant
(c) optionally a protective colloid and
(d) optionally water.

This flameproofing agent is intended primarily for providing synthetic fibrous material, above all textiles, of polyester or polyamide with a flameretardant finish.

Component (a) can consist of both solid and liquid brominated cycloalkanes. However, solid compounds, i.e. those which are in the solid aggregate state at temperatures up to 20° C, are preferred. Particularly suitable compounds are those with a melting point between 80° and 200° C, in particular between 100° and 190° C.

Examples of cycloalkanes which can be used as component (a) are: 1,2,3,4,5,6-hexabromocycloheptane, above all 1,2,3,4- or 1,2,4,6-tetrabromocyclooctane or, in particular, 1,2,5,6,9,10-hexabromocyclododecane (abbreviated hereinafter to HBCD). Preferably HBCD is used by itself as active substance. These compounds are known and are manufactured by methods which are known per se.

Suitable dispersants as component (b) are, for example, the conventional dispersants used in the dyestuffs and textile industry: lignin sulphonates, aromatic sulphonic acids, saturated aliphatic dicarboxylic acids which are substituted by long-chain alkyl radicals, condensation products of aromatic sulphonic acids and formaldehyde, alkylphenol/ethyleneoxy adducts, fatty acid, fatty amine or fatty alcohol/ethyleneoxy adducts, sulphated substituted benzimidazoles, sulphonated fatty acid amides. Good results are obtained above all with lignin sulphonates, with ethyleneoxy adducts of alkylphenols, fatty amines, fatty alcohols or fatty acids and, in particular, with substituted benzimidazoles or with condensation products of aromatic sulphonic acids and formaldehyde.

It is preferable to use those dispersants which at elevated temperatures, e.g. at 180° to 220° C, do not produce any yellowing of the treated substrate or which at most only result in a yellowing which can be removed in the washing-off. In other words, the dispersants either must not decompose at elevated temperature of they should form only soluble or volatile decomposition products. The amount of dispersant used is preferably between 1 and 60 percent by weight, based on the amount of HBCD. Particularly good results are obtained with 1 to 50, above all 1 to 20 and especially 1 to 4, percent by weight of dispersant, based on the amount of HBCD.

The storage stability ca be increased if the aqueous suspensions or dispersions also contain a protective colloid as component (c). Suitable protective colloids are those conventionally used in the art, e.g. polyvinyl alcohol, polyvinyl pyrrolidone, methyl cellulose, carboxymethyl cellulose, hydroxyethyl or hydroxypropyl cellulose, gelatins, acid casein, starch paste or polymers of monomers of the acrylic acid series, for example polyacrylic acid, ethyl acrylate or methylmethacrylate copolymers. Good results are obtained above all with polyvinyl alcohol, hydroxyethyl cellulose and, especially, with carboxymethyl cellulose.

The aqueous preparations contain as a rule 50 to 700 g/kg, preferably 200 to 700 g/kg, in particular 200 to 500 g/kg, of brominated cycloalkane; 0.1 to 300 g/kg, preferably 0.2 to 200 g/kg, especially 5 to 40 g/kg, of dispersant; 0 to 30 g/kg, preferably 0 to 10 g/kg of protective colloid. The preparations are bulked to 1 kg with water.

The component (a) is desirably ground as an aqueous dispersion in the presence of a dispersant in such a manner that the particles have an average diameter of 1 to 30µ, preferably 1 to 20µ. Good results are obtained above all with dispersions in which the particle size is 1 to 10µ, especially 1 to 5µ. The particle size has no actual influence on the flame-retardant finishes, but it does have an influence on the stability of the dispersions.

The brominated cycloalkanes wet only poorly, so that they are advantageously not suspended in water until directly before use, but already beforehand. Pure suspensions, however, are relatively unstable and the component (a) precipitates rapidly. A dispersant is therefore added to the preparation according to the invention, since this prevents a rapid sedimentation of component (a). This sedimentation can be prevented almost completely by the further addition of a protective colloid. The protective colloids can be incorporated into the dispersion before or after the grinding.

If need be, such dispersions can be coverted into solid commercial forms by drying them in known manner, for example, in a spray dryer or in a conventional paddle dryer. These solid forms can be reconverted into dispersions at any time.

The grinding of the solid component (a) is effected in conventional devices suitable for such a purpose, e.g. in a glass ball mill, a sand mill or in a corundum disc mill.

It is a further object of the invention to provide a method of providing synthetic materials of polyester or polyamide with a flame-retardant finish using an organic bromine compound, which comprises treating these materials with the aqueous flameproofing agent according to the invention and subjecting the treated materials to a heat treatment, the procedure being carried out in such a manner that, after the heat treatment, the add-on of component (a) on the treated fibrous material is 0.5 to 7 percent by weight, based on the weight of the treated material.

The flameproofing agent, which is in the form of a concentrated aqueous emulsion, above all, however, of a concentrated aqueous suspension, is diluted with water to provide a treatment liquor in such a manner that, having regard to the liquor pick-up by the fibrous material to be treated, the add-on of component (a) is ensured.

According to the invention, the procedure to be followed is preferably that the fibrous material is dried after the treatment with the aqueous flameproofing agent and optionally then subjected to a heat treatment at elevated temperature. A suitable method consists in drying the treated material at temperatures up to 100° C, e.g. 70° to 100° C, and subjecting it to a heat treatment of over 100° C, e.g. 100° and 220° C or, in particular, 150° to 220° C, i.e. carrying out a thermosol treatment.

The thermosol process is carried out preferably at 175° to 220° C and lasts normally from 10 to 200 seconds, preferably from 20 to 100 seconds. Particularly good results are obtained with treatment times of 10 to 60 seconds.

Preferably the process is carried out in such a manner that, depending on the nature of the fibrous material and its surface weight, and by diluting the flameproofing agent with water, the add-on of component (a) on the fibrous material is 0.5 to 5.3 percent by weight, or especially 0.5 to 4.5 percent by weight, based on the weight of the treated fibrous material.

The polyester and polyamide fibrous materials which can be provided with a flame-retardant finish according to the invention can be in any desired stage of processing, i.e. they can be treated as staple fibres or endless filaments, as woven or knitted fabrics, dyed or undyed, or as textiles which have already been further processed. Preferably, however, they are always in the form of textile fibrous material.

The flameproofing agent which contains the component (a) can be applied to the fibrous material by conventional methods, e.g. by spraying, printing, preferably by exhaustion or, especially, by padding.

Preferably polyester fibrous materials are finished. Such materials are preferably those derived from terephthalic acid, e.g. poly(ethylene glycol terephthalate) or poly(1,4-cyclohexylene-dimethylene terephthalate). Polyester fibres which can be finished effectively according to the invention are described, for example, in U.S. Pat. No. 2,465,319 or 2,901,446.

Examples of polyamide fibres are those of poly-2-caprolactam, polyhexylmethylenediamine adipate or poly-ω-aminoundecanoic acid.

According to the invention, there are obtained on polyester and polyamide fibrous materials permanent flame-retardant finishes which are also retained after several washes or dry cleanings. The finishes also have the advantage that the handle of the finished fibrous materials does not have an oily feel as is often the case when known agents are used. Futhermore, the tendency of the fabric to dry and wet soiling is greatly reduced. The fastness to light and rubbing of dyeings is scarcely affected.

A particular advantage of the process according to the invention, however, resides in the fact that improved flame-retardant finishes are obtained with the application of smaller amounts of flameproofing agent.

In addition, the flame-retardant finish according to the invention does not have any detrimental effect on the mechanical properties of the treated fibrous materials. In particular, the good handle properties of the treated fabrics are scarcely impaired owing to the small amount of flameproofing agent applied. The same also applies to the low stiffness in flexure and the high tear strength of the finished fibrous materials. Even printed fabrics can be treated according to the invention without the quality of the print being in any way thereby impaired.

The flameproofing agents according to the invention can also be used simultaneously with dyes or fluorescent brighteners, so that it is possible to dye or treat with fluorescent brighteners and to flameproof in one process.

Good results are also obtained when using smaller amounts of dispersant, e.g. 0.1 to 3 percent by weight, based on the treatment liquor, so that no washing-off is necessary.

In the following manufacturing directions and Examples, the parts and percentages are by weight.

MANUFACTURING DIRECTIONS FOR DISPERSIONS

A. 220 g of HBCD are dispersed in a solution of 8 g of a condensation product of naphthalenesulphonic acid and formaldehyde in 172 g of water and the dispersion is ground in a glass ball mill to an average particle size of 10μ. After termination of the grinding, 40 g of a 5% solution of carboxymethyl cellulose (degree of etherification = 0.85; viscosity of the 1% solution = 10–20 cP) are added to an stirred into the formulation. A readily flowable, storable dispersion is obtained which, on settling, gives an easily stirrable sediment.

B. 222 g of HBCD are dispersed in a solution of 4.4 g of the sodium salt of 1-benzyl-2-heptadecyl-benzimidazole-disulphonic acid in 174 g of water and the dispersion is ground in a sand mill to an average particle size of 5μ. After termination of the grinding, 44 g of a 10% solution of a polyvinyl alcohol (degree of hydrolysis = 88%; viscosity of the 4% solution = 20 cP) are added to the dispersion which is then thoroughly mixed. A readily pourable and dilutable, storable dispersion is obtained.

C. 222 g of HBCD are dispersed in a solution of 8.8 g of the sodium salt of 1-benzyl-2-heptadecyl-benzimidazole-disulphonic acid in 171 g of water and the dispersion is ground in a corundum disc mill to an average particle size of 10μ. Then 44 g of a 10% solution of a hydroxyethyl cellulose (degree of substitution = 2.5; viscosity of the 2% solution = 150–400 cp) are stirred into the resultant dispersion. A readily pourable and dilutable dispersion is obtained.

D. 600 g of HBCD are dispersed in a solution of 300 g of a condensation product of naphthalenesulphonic acid and formaldehyde in 600 g of water and the dispersion is ground in a glass ball will to an average particle size of 5μ. After the dispersion has been dried in a paddle dryer and subsequently ground, or after it has been spry dried, there is obtained a powder which can be redispersed in water.

E. The procedure of Direction B is carried out except that 200 g of HBCD, 4 g of the same dispersant, 2 g of carboxymethyl cellulose and 194 g of water are used. A readily pourable and dilutable dispersion is obtained (diameter of the particles: 10μ).

F. 5 g of a dispersant are dissolved in 25 g of water. To this solution are poured in 10 g of HBCD and 50 g of glass beads (diameter: 1 mm). Stirring is performed for 24 hours. The dispersion is afterwards separated from the glass beads and the particle size determined. A fine dispersion of HBCD is obtained which is raeda for use.

| Batch | Dispersant | Particle size μ |
|---|---|---|
| F₁ | condensation product of 1 mole of cresol 0.1 mole of 2-naphthol-6-sulphonic acid, 0.6 mole of sodium sulphite and 1.5 mole of formaldehyde | 1–2 |
| F₂ | 2.5 g of lignin sulphonate obtained from acid wood pulp 2.5 g of lignin obtained from alkaline wood pulp | 1–2 |
| F₃ | lignin sulphonate obtained from wood pulp | 1–2 |
| F₄ | lignin sulphonate obtained from acid wood pulp | 1–2 |

G. 200 g of HBCD are ground to a fine, readily pourable and dilutable dispersion (particle size 2 to 4 μ) in a solution of 2 g of oleylmethyl tauride (sodium salt) as dispersant in 198 g of water in accordance with Direction A.

H. The procedure of Direction G is carried out except that 2 g of dioctyl sulphosuccinate (sodium salt) are used as dispersant. The particle size of the resultant readily pourable and dilutable dispersion is 1 to 4 μ.

I. 10 g of HBCD, 38 g of water and 2 g of an adduct of 1 mole of 4-nonylphenol and 35 moles of ethylene oxide as dispersant are processed with 50 g of glass beads as in Direction F to a fine dispersion which is ready for use. Particle size: 1 to 4 μ.

J. The procedure of Direction I is carried out except that 39 g of water and 1 g of an adduct of 1 mole of laurylamine and 4 moles of ethylene oxide are used. A fine dispersion which is ready for use is obtained. Particle size: 1 to 4 μ.

K. The procedure of Direction I is carried out except that 39 g of water and 1 g of an adduct of mole of oleic acid and 4 moles of ethylene oxide are used. A fine dispersion which is ready for use is obtained. Particle size: 1 to 4 μ.

L. 180 g of 1,2,3,4-tetrabromocyclooctane, 36 g of a condensation product of naphthalenesulphonic acid and formaldehyde, 384 g of water and 400 g of glass beads (diameter: 1 mm) are stirred to a dispersion. The dispersion is separated from the glass beads to yield a disperion which is ready for use and having an average particle size of 1 to 3 μ.

M. The procedure of Manufacturing Direction I is carried out, except that 180 g of 1,2,5,6-tetrabromocyclooctane are used. A dispersion which is ready for use and having an average particle size of 1 to 3 μ is obtained

EXAMPLE 1

Polyester fabrics with a weight per unit area of 150 g/m² are padded with the aqueous treatment liquor according to Table I, dried for 30 minutes at about 80° C and subsequently subjected to a thermosol treatment over the course of the time indicated at 200° C.

The degree of thermosolation indicates the amount of product present on the fibrous material after the thermosol treatment (based on the amount originally taken up).

The fabrics are then washed for 5 minutes at 60° C in a liquor which contains per liter 2 g of anhydrous sodium carbonate and 1 g of a condensation product of 1 mole of p-nonylphenol and 9 moles of ethylene oxide. The fabrics are subsequently rinsed and dried.

The degree of fixation indicates the amount of product which is present on the fibrous material after the wash (based on the amount taken up after the thermosol treatment).

In the subsequent rapid wash, the fabrics are agitated for 2 to 4 hours at 95° C in a liquor which contains 5 g/l of $Na_3PO_4$ and 1 g of p-isooctylphenylpolyethoxyethanol. The liquor ratio is 1:40.

On the other hand, a number of the fabrics are washed for 45 minutes at 60° C in a domestic washing machine in a liquor which contains 4 g/l of a household detergent (SNV 198 861 — Wash).

The individual fabric samples are then tested for their flame resistance (vertical test DIN 53 906, ignition time 6 seconds).

Table I

| | untreated | treated with liquors % dispersions according to Direction | | | | | | | | | | | |
|---|---|---|---|---|---|---|---|---|---|---|---|---|---|
| | | A | B | C | E | $F_1$ | $F_2$ | $F_3$ | $F_4$ | G | H | I | J | K |
| % HBCD in dispersion | | 50 | 50 | 50 | 50 | 25 | 23 | 25 | 25 | 50 | 50 | 25 | 25 | 25 |
| liquor pick-up in % | | 65 | 65 | 65 | 65 | 65 | 65 | 65 | 65 | 65 | 65 | 65 | 65 | 65 |
| g dispersion/kg of liquor | | 169 | 169 | 188 | 170 | 308 | 308 | 308 | 308 | 155 | 155 | 430 | 430 | 430 |
| thermosol treatment temperature ° C | | 200 | 200 | 200 | 200 | 200 | 200 | 200 | 200 | 200 | 200 | 200 | 200 | 200 |
| duration of thermosol treatment in secs. | | 20 | 20 | 20 | 20 | 20 | 20 | 20 | 20 | 60 | 60 | 60 | 60 | 60 |
| % add-on after drying*) | | 5,5 | 5,3 | 5,3 | 6 | 7,2 | 5,3 | 4,9 | 4,9 | 4 | 5,7 | 7,4 | 6,4 | 6, |
| % add-on after thermosol treatment*) | | 5 | 4,8 | 4,7 | 5,2 | 6,9 | 4,9 | 4,8 | 4,6 | 3,4 | 4,6 | 6,7 | 5,1 | 4, |
| % add-on after wash | | 4,5 | 4,2 | 4,2 | 5,2 | 4,3 | 3,2 | 3,3 | 3 | 2,8 | 4,6 | 5,5 | 5,1 | 4, |
| % degree of thermosol treatment*) | | 91 | 91 | 89 | 87 | 96 | 92 | 97 | 93 | 85 | 81 | 91 | 80 | 7 |
| % degree of fixation without thermosol treatment | | 90 | 88 | 90 | 100 | 62 | 65 | 65 | 65 | 82 | 100 | 82 | 100 | 10 |
| % degree of fixation with thermosol treatment | | 84 | 79 | 79 | 87 | 60 | 60 | 63 | 61 | 70 | 81 | 74 | 80 | 7 |
| handle after washing-off | 0 | 1½ | 2 | 1¾ | 1¾ | 1 | 1 | 1 | 1 | ½ | 1¾ | 1 | 1½ | |
| Flame resistance | | | | | | | | | | | | | | |
| after thermosol treatment combustion time in secs. | 19 | 1 | 8 | 3 | 0 | — | — | — | — | — | — | 0 | — | - |
| tear length in cm | 9 | 6,5 | 7 | 6,5 | 6,5 | — | — | — | — | — | — | 6 | — | - |
| after washing-off combustion time in secs. | 18 | 1 | 1 | 0 | 1 | 0 | 0 | 0 | 0 | 3 | 0 | 0 | — | - |
| tear length in cm | 10 | 7 | 7 | 6 | 3 | 5,5 | 6 | 6 | 5,5 | 7,5 | 7 | 5,5 | — | - |
| after 20 machine washes combustion time | 18 | — | — | — | — | 0 | 0 | 0 | — | — | 0 | 0 | | |

Table I-continued

|  | un-treated | treated with liquors % dispersions according to Direction | | | | | | | | | | | | |
|---|---|---|---|---|---|---|---|---|---|---|---|---|---|---|
|  |  | A | B | C | E | $F_1$ | $F_2$ | $F_3$ | $F_4$ | G | H | I | J | K |
| in secs. |  |  |  |  |  |  |  |  |  |  |  |  |  |  |
| tear length in cm | 9,5 | — | — | — | — | 6,5 | 6,5 | 7 | 6 | — | — | 6,5 | 7 | 7 |
| after 25 machine washes |  |  |  |  |  |  |  |  |  |  |  |  |  |  |
| combustion time in cm | 18 | 0 | 1 | 1 | — | — | — | — | — | 2 | 2 | — | — | — |
| tear length in cm | 9 | 8 | 7,5 | 8,5 | — | — | — | — | — | 8 | 8 | — | — | — |
| after rapid wash |  |  |  |  |  |  |  |  |  |  |  |  |  |  |
| combustion time in secs. | 17 | — | — | — | 1 | 0 | 0 | 0 | 1 | — | — | 0 | 0 | 0 |
| tear length in cm | 0,5 | — | — | — | 7 | 6,5 | 6 | 3,5 | 6 | — | — | 6,5 | 7,5 | 7 |

Handle Rating:
0 = unchanged
1 = a trace stiffer than 0
2 = somewhat stiffer than 0
3 = stiff
4 = very stiff
*)corrected application, i.e. dispersant allowed for.

Instead of one of the indicated treatment liquors it is also possible to use the product of Direction D in redispersed form and similarly good results are obtained.

EXAMPLE 2

The same procedure is carried out as in Example 1 using treatment liquor E, but a synthetic polyamide 66 fabric (surface weight 177 g/m$^2$) is finished instead of a polyester fabric. The liquor pick-up is 100%, the concentration of the HBCD dispersion is 110 g/kg of liquor, but otherwise the conditions are the same:

|  |  | untreated |
|---|---|---|
| % add-on after drying | 5.8 |  |
| % add-on after thermosol treatment | 5 |  |
| % add-on after washing-off | 4.2 |  |
| % degree of thermosol treatment | 86 |  |
| % fixation without thermosol treatment | 84 |  |
| % fixation with thermosol treatment | 72 |  |
| handle after washing-off | 1 |  |
| flame resistance |  |  |
| before thermosol treatment |  |  |
| combustion time in secs. | 0 | 14 |
| tear length in cm | 7 | 9 |
| after thermosol treatment |  |  |
| combustion time in secs | 0 | 14 |
| tear length in cm | 7 | 9 |
| after washing-off |  |  |
| combustion time in secs. | 0 | 14 |
| tear length in cm | 7 | 9 |

EXAMPLE 3

Polyester fabric with a weight per unit area of 162 g/m$^2$ is padded for 30 minutes with the aqueous liquors according to Table II and dried at about 80° C and subsequently subjected to a thermosol treatment for 20 seconds at 200° C. The liquor pick-up is about 60%.

The washing-off is effected as in Example 1. The fabric is subsequently washed up to 40 times over the course of 45 minutes at 60° C in a domestic washing machine in a liquor which contains 4 g/l of a household detergent (SNV 198 861 — Wash).

The fabric is then tested for its flame resistance (Vetical Test DIN 53 906, ignition time: 3 seconds).

Table II

|  | untreated | treated with liquors | |
|---|---|---|---|
|  |  | L | M |
| % active substance in dispersion |  | 30 | 30 |
| g dispersion/kg liquor |  | 55,5 | 55,5 |
| % application after washing-off |  | 0,5 | 4,6 |
| handle after washing-off | 0 | 0 | 1 |
| flame resistance |  |  |  |
| after 20 machine washes |  |  |  |
| combustion time secs. | burns | 2 | 0 |
| a tear length cm |  | 8 | 7,5 |
| after 40 machine washes |  |  |  |
| combustion time secs. | burns | 0 | 0 |
| tear length cm |  | 8,5 | 7 |

EXAMPLE 4

Polyester fabrics with different weights per unit area are padded with treatment liquors which contain variable amounts of the dispersion according to Direction A. The fabrics and the amounts of the dispersions used are indicated in Table III. The fabrics are dried at 80° C for 30 minutes and subsequently subjected to a thermosol treatment at 200° C over the course of 20 seconds. The washing-off is effected as indicated in Example 1. The fabrics are subsequently washed up to 20 times for 45 minutes at 60° C in a domestic washing machine in a liquor which contains 4 g/l of a household detergent (SNV 198 861 — Wash).

The individual fabrics are then tested for their flame resistance (Vertical Test DIN 53 906, ignition time: 3 seconds).

The results are reported in Table III. The handle ratings have the same meanings as in Example 1.

Table III

| fabric of weight | Polyester/213 treated with liquors | | | | | Polyester/275 treated with liquors | | | | | |
|---|---|---|---|---|---|---|---|---|---|---|---|
|  | I | II | III | IV | untreated | I | VI | VII | VIII | IX | untreated |
| % HBCD in dispersion | 50 | 50 | 50 | 50 |  | 50 | 50 | 50 | 50 | 50 |  |
| % liquor pick-up | 60 | 60 | 60 | 60 |  | 60 | 60 | 60 | 60 | 60 |  |
| g of dispersion/kg of liquor | 33,2 | 83,5 | 167 | 250 |  | 16,6 | 33,2 | 83,5 | 167 | 250 |  |
| % add-on after drying | — | — | 5 | 8,6 |  | — | 1,3 | 1,7 | 4,7 | 6,2 |  |
| % add-on after thermosol treatment | 0,9 | 1,4 | 3,6 | 5,9 |  | 0,4 | 1,3 | 1,5 | 4,5 | 6 |  |

Table III-continued

| fabric of weight | Polyester/213 treated with liquors | | | | | Polyester/275 treated with liquors | | | | | |
|---|---|---|---|---|---|---|---|---|---|---|---|
| | I | II | III | IV | untreated | I | VI | VII | VIII | IX | untreated |
| % add-on after washing-off | — | — | 2,9 | 5,1 | | — | 1,3 | 1,5 | 4,2 | 5,7 | |
| % degree of thermosol treatment | — | — | 72 | 69 | | — | 100 | 88 | 96 | 97 | |
| % degree of fixation without thermosol treatment | — | — | 80 | 86 | | — | 100 | 100 | 93 | 95 | |
| % degree of fixation with thermosol treatment | — | — | 58 | 59 | | | 100 | 88 | 89 | 92 | |
| handle after washing-off | 0 | ½ | 1 | 1½ | 0 | 0 | 0 | ½ | 1 | 1½ | 0 |
| flame resistance after washing-off combustion time in secs. | 2 | 0 | 0 | 0 | burns | 0 | 5 | 0 | 0 | 0 | burns |
| tear length in cm | 6 | 6 | 6 | 6 | | 5 | 6 | 4,5 | 5 | 5 | |
| after 20 machine washes combustion time in secs. | 1 | 0 | 0 | 0 | | 3 | 1 | 0 | 0 | 0 | |
| tear length in cm | 6,5 | 6 | 6,5 | 6 | | 6 | 5,5 | 6,5 | 6 | 5 | |

EXAMPLE 5

A polyamide fabric with a weight per unit area of 177 g/m² is padded with a treatment liquor which contains variable amounts of dispersion A according to Direction A. The drying, the thermosol treatment, the washing-off and the single wash in the domestic washing machine are carried out as indicated in Example 4. The same applies to the test of the flame resistance and the evaluation of the handle.

The results are reported in Table IV.

Table IV

| | fabric treated with liquors | | untreated |
|---|---|---|---|
| | I | II | |
| % HBCD in dispersion | 50 | 50 | |
| % liquor pick-up | 60 | 60 | |
| g of dispersion /kg of liquor | 167 | 250 | |
| % add-on after drying | 3,1 | 8,1 | |
| % add-on after thermosol treatment | 2,3 | 7,0 | |
| % add-on after final wash | 1,3 | 5,3 | |
| % degree of thermosol treatment | 74 | 87 | |
| % degree of fixation without thermosol treatment | 56 | 76 | |
| % degree of fixation with thermosol | 42 | 66 | |
| handle after washing-off | 1 | 1 | 0 |
| flame resistance after washing-off combustion time in secs. | 6 | 1 | |
| tear length in cm | 8 | 8 | burns |
| after 1 machine wash combustion time in secs. | 3 | 2 | |
| tear length in cm | 8,3 | 8 | |

EXAMPLE 6

Polyester fabrics with a weight per unit area of 150 g/m² are padded with the aqueous treatment liquors according to Table V, dried for 30 minutes at about 80° C and subsequently subjected to a thermosol treatment for 60 minutes at 200° C. The fluorescent brightener used in treatment liquors I to IV has the formula

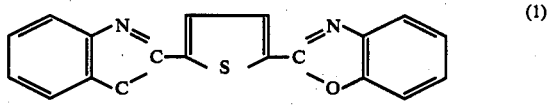

The dye used in treatment liquors V to IX has the formula

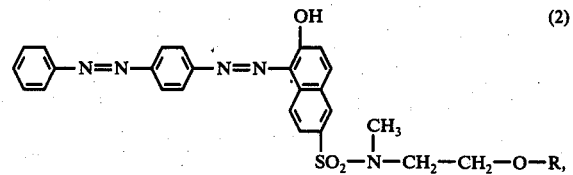

wherein R represents 50% hydrogen and 50%

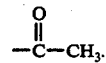

After the fabrics have been padded they are given a washing-off as in Example 1 and tested for their flame resistance (Vertical Test DIN 53 906, ignition time 3 seconds) and for their mechanical properties. The handle is rated as indicated in Example 1. In addition, the stiffnes in flexure is measured in the ASTM D-1388-64 T test and the tear strength in the SNV Test 198461. The results reported in Table V show that fabrics can be simultaneously dyed, brightened and flameproofed with scarcely any impairment of the good mechanical properties.

Table V

| | fabrics treated with liquors | | | | | | | | | untreated |
|---|---|---|---|---|---|---|---|---|---|---|
| | I | II | III | IV | V | VI | VII | VIII | IX | |
| % HBCD in dispersion according to Direction A | 50 | 50 | — | — | 50 | 30 | 50 | — | — | — |
| g of dispersion/kg of liquor | 167 | 167 | — | — | 167 | 167 | 167 | — | — | — |
| g of dye (ca.80%) of the formula (1)/kg of liquor | — | — | — | — | 2,9 | 11,7 | 35 | 2,9 | 35 | — |
| g of fluorescent brightener (ca.8%) of the formula (2)/kg of liquor | 16,7 | 33,4 | 16,7 | 33,4 | — | — | — | — | — | — |
| % add-on of HBCD after drying | 5,4 | 5,9 | — | — | 4,9 | 5,4 | 6,9 | — | — | — |

Table V-continued

|  | fabrics treated with liquors | | | | | | | | | un-treated |
|---|---|---|---|---|---|---|---|---|---|---|
|  | I | II | III | IV | V | VI | VII | VIII | IX | |
| % add-on of HBCD after thermosol treatment | 4,5 | 4,7 | — | — | 4,2 | 4,6 | 6,1 | — | — | — |
| % application of HBCD after washing-off | 4 | 4,5 | — | — | 3,3 | 3,9 | 4,1 | — | — | — |
| % degree of thermosol treatment | 83 | 80 | — | — | 86 | 85 | 88 | — | — | — |
| % degree of fixation without thermosol treatment | 89 | 96 | — | — | 79 | 85 | 67 | — | — | — |
| % degree of fixation with thermosol treatment | 74 | 76 | — | — | 67 | 72 | 60 | — | — | — |
| flame washing-off combustion time in secs. | 0 | 1 | burns | burns | 2 | 0 | 1 | burns | burns | burns |
| tear length in cm | 8,5 | 9 | — | — | 7 | 8 | 9 | — | — | — |
| handle after washing-off | 1 | 1 | ½ | ½ | 1 | 1 | 1 | ½ | ½ | 0 |
| stiffness in flexure after washing-off mg.cm | 202 | 164 | 134 | 159 | 141 | 131 | 144 | 128 | 116 | 145 |
| tear strength after washing-off warp Kp | 41,6 | 42 | 40 | 41,3 | 42,8 | 42,2 | 40,4 | 41,7 | 40,2 | 38,3 |
| weft Kp | 29,7 | 29,2 | 30,5 | 32 | 29,7 | 28,2 | 29 | 29,1 | 32 | 32,7 |

EXAMPLE 7

Polyester fabric (5 g) with a weight per unit area of 150 g/m² is treated by the exhaustion process in a HT apparatus under a gauge pressure of about 5 for 1 hour at 140° C with 101 g of a treatment liquor I or with 101.25 g of a treatment liquor II of the following composition:

treatment liquor I:
  1 g of a dispersion according to Direction A
  100 g of water treatment liquor II:
  1 g of dispersion according to Direction A
  100 g of water
  0.25 g of a mixture which consists of a dodecylbenzenesulphonate-triethanolamine salt and an adduct of castor oil fatty acid and ethylene oxide and is dissolved in a solvent mixture of trichlorobenzenes, diphenyl, xylene, m-hexanol and ethylene glycol.

In contrast to Example 1, a washing-off is not carried out in this Example. After the termination of the treatment, each of the fabrics is washed 20 times in a domestic washing machine for 45 minutes at 60° C in a liquor which contains 4 g/l of a household detergent (SNV 198 861 - Wash).

The add-on of HBCD on the fabric samples is determined before and after the washes. After the washes, the flame resistance is also tested in the DIN 53 906 Vertical Test at an ignition time of 3 seconds.

The results are reported in Table VI.

Table VI

|  | fabrics treated with liquors | | untreated fabric |
|---|---|---|---|
|  | I | II | |
| % add-on after exhaustion | 5,7 | 6,1 | — |
| % add-on after 20 washes | 5,4 | 6,1 | — |
| flame resistance after 20 washes combustion time in secs. | 0 | 0 | burns |
| tear length in cm | 6,5 | 7,5 | |

We claim:

1. A flameproofing agent consisting essentially of 200 to 700 g/kg of a 1,2,5,6,9,10-hexabromocyclododecane (b) 0.1 to 300 g/kg of a dispersant selected from the group consisting of lignin sulphonates, ethyleneoxy adducts of alkylphenols, fatty amines, fatty alcohols or fatty acids, aromatic sulphonic acids or condensation products thereof with formaldehyde, saturated aliphatic dicarboxylic acids with long-chain alkyl radicals, sulphated substituted benzimidazoles or sulphonated fatty acid amides, (c) 0 to 30 g/kg of a protective colloid selected from the group consisting of polyvinyl alcohol, hydroxyethyl cellulose or carboxymethyl cellulose, and (d) water in order to bulk the flameproofing agent to 1 kg, said flameproofing agent being present in form of an aqueous dispersion, whose particles have an average diameter of 1 to 30 μ.

2. A flameproofing agent according to claim 1, which contains as component (b) sulphated substituted benzimidazoles or condensation products of aromatic sulphonic acids with formaldehyde.

3. A flameproofing agent according to claim 1, which contains carboxymethyl cellulose as component (c).

4. A flameproofing agent according to claim 1, which contains 200 to 500 g/kg of component (a), 0.2 to 2 g/kg of component (b), 0 to 10 g/kg of component (c) and is bulked with water to 1 kg.

* * * * *